United States Patent
Barbalho et al.

(10) Patent No.: US 11,113,192 B2
(45) Date of Patent: Sep. 7, 2021

(54) METHOD AND APPARATUS FOR DYNAMICALLY ADAPTING CACHE SIZE BASED ON ESTIMATED CACHE PERFORMANCE

(71) Applicant: EMC IP HOLDING COMPANY LLC, Hopkinton, MA (US)

(72) Inventors: Hugo de Oliveira Barbalho, Rio de Janeiro (BR); Jonas Furtado Dias, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 80 days.

(21) Appl. No.: 16/691,727

(22) Filed: Nov. 22, 2019

(65) Prior Publication Data

US 2021/0157725 A1 May 27, 2021

(51) Int. Cl.
*G06F 12/08* (2016.01)
*G06F 12/0802* (2016.01)

(52) U.S. Cl.
CPC .... *G06F 12/0802* (2013.01); *G06F 2212/282* (2013.01)

(58) Field of Classification Search
CPC ............ G06F 12/0802; G06F 2212/282
See application file for complete search history.

(56) References Cited

U.S. PATENT DOCUMENTS

| | | | |
|---|---|---|---|
| 9,734,066 B1* | 8/2017 | Indupuru | G06F 12/123 |
| 9,984,004 B1* | 5/2018 | Little | G06F 12/0811 |
| 2005/0071599 A1* | 3/2005 | Modha | G06F 12/0871 711/170 |
| 2005/0223174 A1* | 10/2005 | Mogi | G06F 16/24552 711/129 |
| 2013/0205092 A1* | 8/2013 | Roy | G06F 9/544 711/130 |
| 2016/0062916 A1* | 3/2016 | Das | G06F 12/1027 711/133 |
| 2018/0129612 A1* | 5/2018 | Lewis | G06F 12/0891 |

(Continued)

OTHER PUBLICATIONS

R. Karedla et al., *Caching Strategies to Improve Disk System Performance*, Computer 0018-9162/94 IEEE 1994, pp. 38-46.

(Continued)

*Primary Examiner* — Ryan Bertram
(74) *Attorney, Agent, or Firm* — Anderson Gorecki LLP

(57) ABSTRACT

A method of dynamically adjusting sizes of cache partitions includes, for each cache partition, estimating a number of hits that would occur on the cache partition for a set of potential size increases of the cache partition and a set of potential size decreases of the cache partition. Based on these estimates, a determination is made for each cache partition, whether to increase the size of the cache partition, maintain a current size of the cache partition, or decrease the size of the cache partition. Cache partition size increases are balanced with cache partition size decreases to allocate the entirety of the cache to the set of cache partitions without over allocating cache resources and while optimizing a sum of total cache hit rates of the set of cache partitions. A set of data structures is used to efficiently determine the estimated hit increases and decreases for each cache partition.

15 Claims, 11 Drawing Sheets

(56) References Cited

U.S. PATENT DOCUMENTS

2018/0189186 A1* 7/2018 Chhabra .............. G06F 21/72
2019/0155638 A1* 5/2019 Asadi .............. G06F 9/45558

OTHER PUBLICATIONS

X. Hu et al., *Fast Miss Ratio Curve Modeling for Storage Cache*, ACM Transactions on Storage, vol. 14, No. 2, Article 12, Apr. 2018 (34 pages).
C. Waldspurger et al., *Efficient MRC Construction with SHARDS*, 13$^{th}$ USENIX Conference on File and Storage Technologies (Fast '15), ISBN 978-1-931971-201 (17 pages).
J. Fu et al., Locality-driven MRC Construction and Cache Allocation, Association for Computing Machinery, HPDC '18 Posters/Doctoral Consortium, Jun. 11-15, 2018, ACM ISBN 978-1-4503-5899-6/18/06 (3 pages).
J. Wires et al., *Characterizing Storage Workloads with Counter Stacks*, 11$^{th}$ USENIX Symposium on Operating Systems Design and Implementation, ISBN 978-1-931971-16-4 (17 pages).

* cited by examiner

METHOD AND APPARATUS FOR DYNAMICALLY ADAPTING CACHE SIZE BASED ON ESTIMATED CACHE PERFORMANCE

BACKGROUND

This disclosure relates to computing systems and related devices and methods, and, more particularly, to a method and apparatus for dynamically adapting cache size based on estimated cache performance.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method of dynamically adjusting sizes of cache partitions includes, for each cache partition, estimating a number of hits that would occur on the cache partition for a set of potential size increases of the cache partition and a set of potential size decreases of the cache partition. Based on these estimates, a determination is made for each cache partition, whether to increase the size of the cache partition, maintain a current size of the cache partition, or decrease the size of the cache partition. Cache partition size increases are balanced with cache partition size decreases to allocate the entirety of the cache to the set of cache partitions without over allocating cache resources and while optimizing a sum of total cache hit rates of the set of cache partitions. A set of data structures is used to efficiently determine the estimated hit increases and decreases for each cache partition.

DETAILED DESCRIPTION

Figure 1:
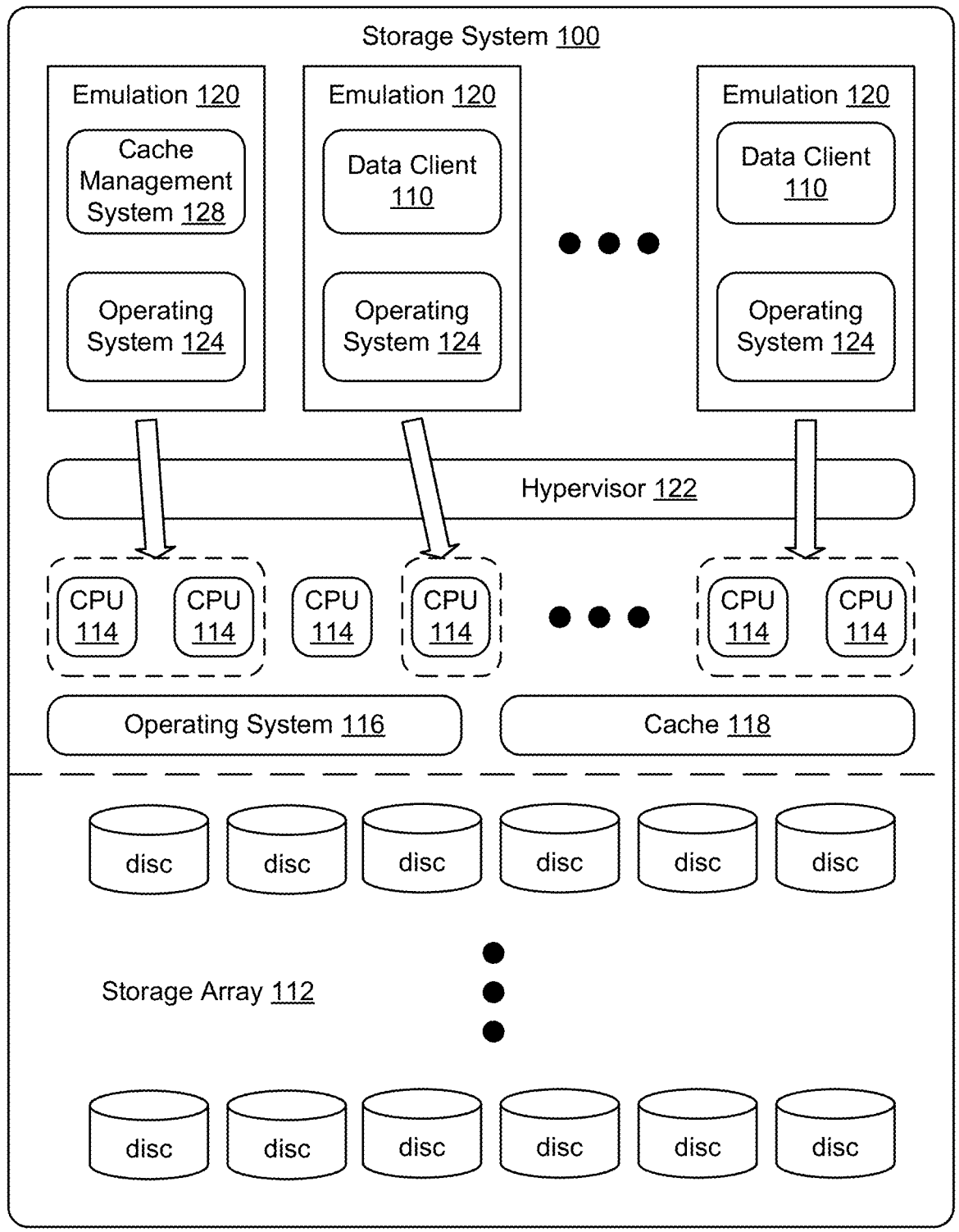
FIG. 1 is a functional block diagram of an example storage system configured according to some embodiments.

FIG. 1 is a functional block diagram of an example storage system 100, in which data clients 110 have access to storage resources provided by a storage array 112. As shown in FIG. 1, in some embodiments the storage system 100 has physical resources including a number of CPU processor cores 114, operating system 116, cache 118, and other physical resources.

Storage array 112 may be implemented using numerous physical drives using different types of memory technologies. In some embodiments the drives used to implement storage array 112 are implemented using Non-Volatile Memory (NVM) media technologies, such as NAND-based flash, or higher-performing Storage Class Memory (SCM) media technologies such as 3D XPoint and Resistive RAM (ReRAM). Storage array 112 may be directly connected to the other components of the storage system 100 or may be connected to the other components of the storage system 100, for example, by an InfiniBand (IB) bus or fabric.

Data clients 110 act as hosts and provide access to the storage resources provided by storage array 112. In some embodiments, data clients 110 execute in emulations 120 instantiated in the context of the storage system 100. In some embodiments, a hypervisor 122 abstracts the physical resources of the storage system 100 from emulations 120, and allocates physical resources of storage system 100 for use by the emulations 120. Each emulation 120 has an emulation operating system 122 and one or more application processes running in the context of the emulation operating system 122.

Figure 2:
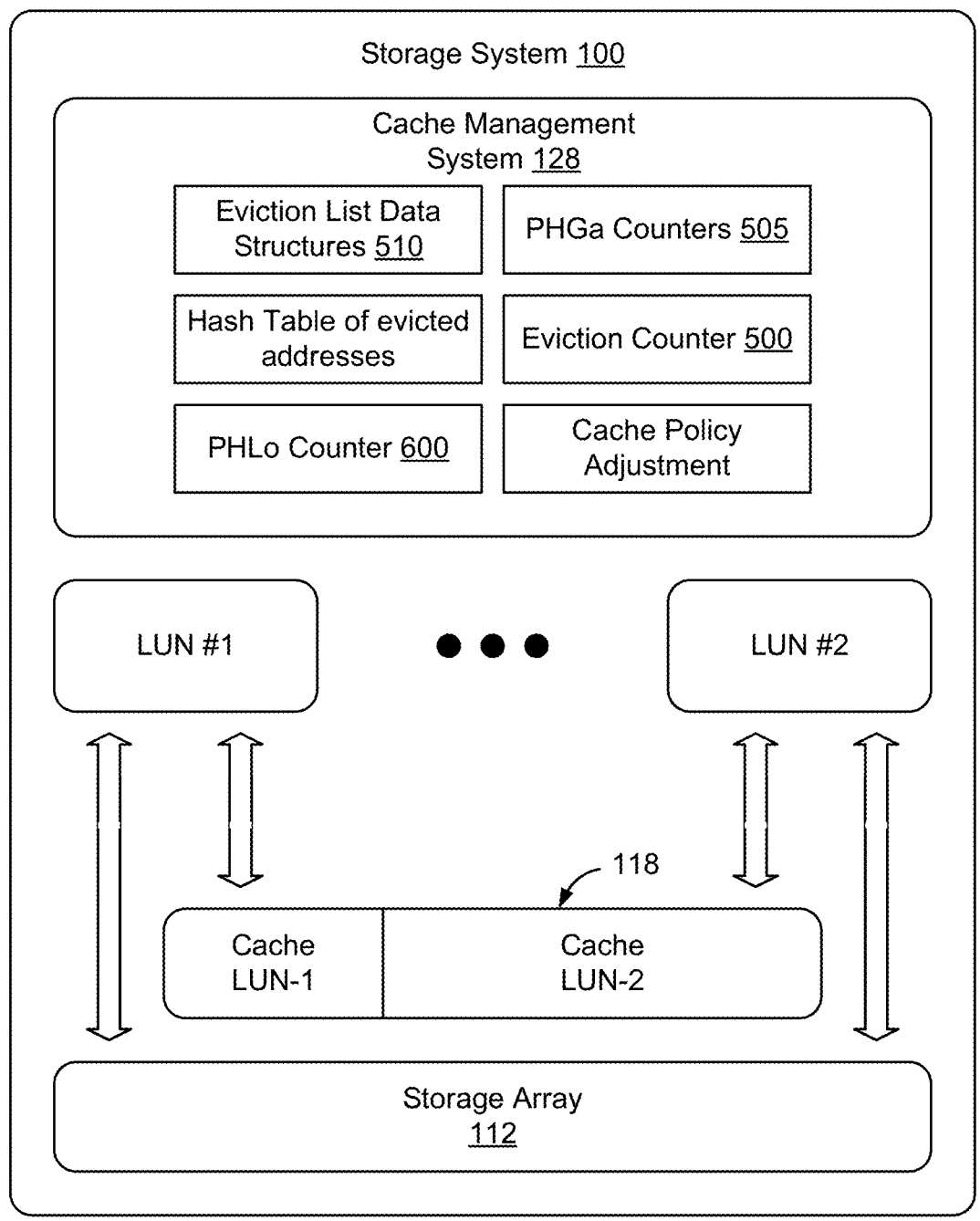
FIG. 2 is a functional block diagram of an example storage system showing the cache management aspects in greater detail according to some embodiments.
Figure 3:
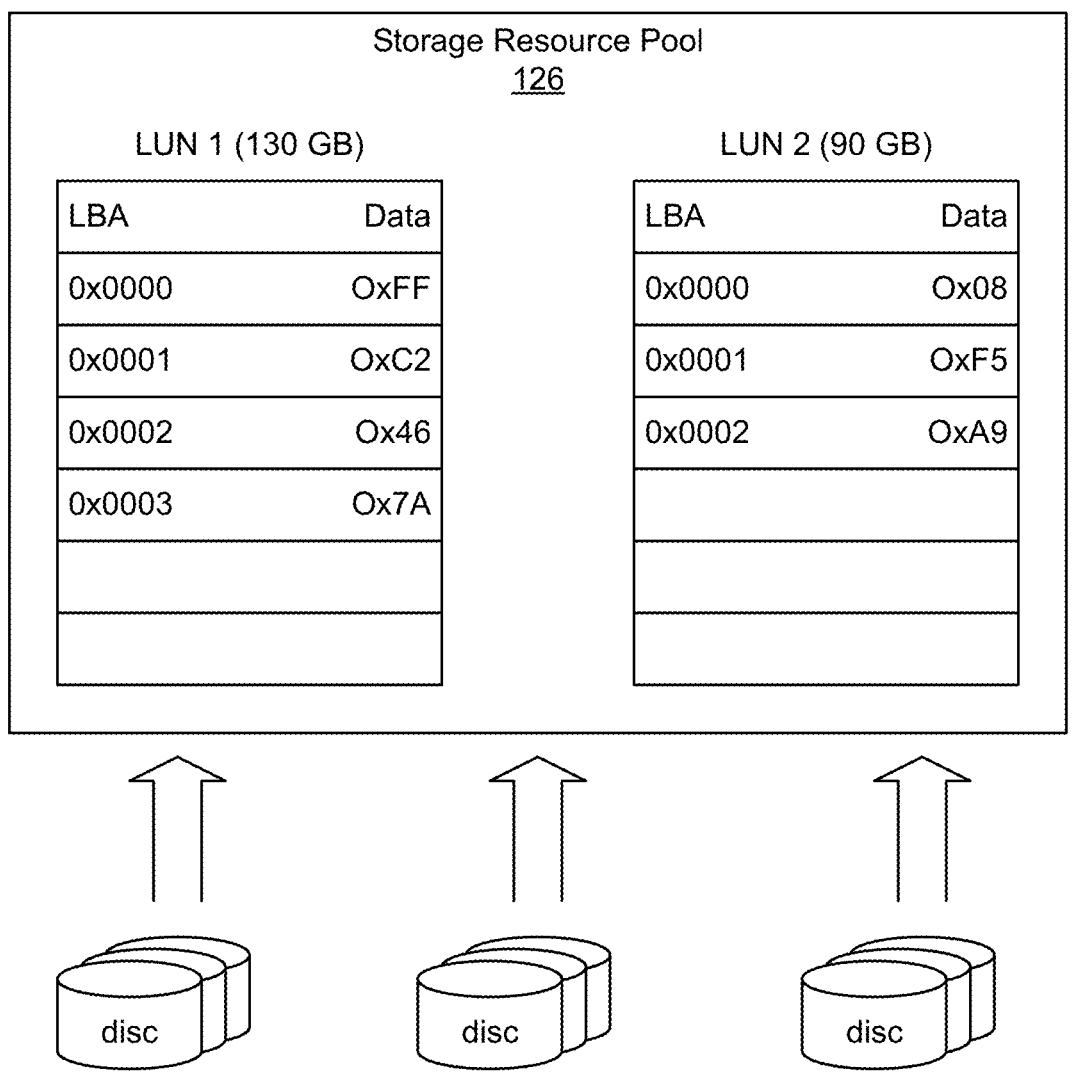
FIG. 3 is a functional block diagram of an example storage system's logical address space according to some embodiments.

FIG. 2 is a functional block diagram of an example storage system showing the cache management aspects in greater detail according to some embodiments. As shown in FIG. 2, the storage system has data clients 110 that perform memory access operations on the storage resources of the storage array 112. As shown in FIG. 3, the storage resources of the storage array 112, in some embodiments, are presented as logical units (LUNs) to the data clients 110. For example, as shown in FIG. 3, a group of storage resources of the storage array 112 may be grouped into a storage resource pool 126. LUNs implemented as separately addressable logical volumes are then created and associated with the storage resource pool 126.

FIG. 2 is a functional block diagram of an example storage system 100, such as the storage system 100 of FIG. 1. Data associated with data client 110 is stored in one or more user filesystems, and each user file system is stored in a separate logical storage volume, referred to herein as a Logical Unit (LUN). A LUN is a logical construct which enables the physical storage resources 110, 112 to be abstracted from the data client 110. The logical storage volume in some instances is referred to as "thin" if actual physical storage resources of storage array 112 are only allocated by the storage system 100 to the Thin Logical Unit (TLU) when used. Thus, if a LUN is thin, the amount of physical storage resources allocated to a LUN will increase and decrease over time as the file system stored on the LUN increases and decreases in size.

Resources meant for caching are usually shared among several beneficiaries. Workloads from distinct applications or assigned to different LUNs have different Service Level Agreements (SLAs). Example service levels may include the expected average response time for an IO operation on the TLU, the number of IO operations that may be performed on a given TLU, and other similar parameters. One manner in which the storage system 100 seeks to meet the SLAs for the various data clients 110 is to optimize use of the cache 118.

Cache mechanisms are crucial to computer systems such as storage arrays and compute clusters. Correctly placing data with a high probability of being requested on fast memory media can substantially reduce the response times of input/output (I/O) requests. However, the diversity and the unpredictability of the I/O stream commonly nurture the allocation of large memory areas for caching purposes. Since dynamic random-access memory (DRAM) hardware is expensive, it is important to properly asses cache sizes to improve resource utilization.

Unfortunately, physical cache resources are limited, and the optimal cache area allocation may not be apparent, which may lead to inadequate resource utilization and SLA infringement. According to some embodiments, a method is provided that identifies how the cache hit rate would be expected to change if the relative sizes of the cache partitions are changed. By determining how the cache hit rate would be affected, it is possible to enable the cache sizes to be adapted dynamically. In some embodiments, cache management system 128 (see FIG. 1, FIG. 2) is configured to monitor use of cache 118 and adjust the sizes of the cache partitions to optimize performance of the cache 118. For example, the cache management system 128 can reduce the size of a first cache partition allocated to a first LUN and increase the size of a second cache partition allocated to a second LUN to increase the overall cache hit rate of the storage system.

There is no general rule that specifies the amount of cache required to obtain a given cache hit ratio. The intrinsic dynamics of the Least Recently Used (LRU) eviction policy and the stochastic behavior of the workload makes the functioning of the cache difficult to predict. Often, cache sizes are set by experimenting with different sizes to assess performance, which may be too costly or not viable in certain situations.

Additionally, even when the cache sizes are properly established initially, the cache performance tends to be affected as the workload changes over time. The frequency of requests, their sizes, and how sequential the reads are will drastically affect how much benefit the cache can provide. For example, if a workload includes primarily sequential requests, then increasing the cache size will cause an increase in performance overall. However, if the current workload primarily contains a series of random reads, increasing the cache size will not lead to significantly greater performance. However, even if the current workload is primarily random reads, it is not prudent to reduce the cache size without information about how much a reduction would cause the cache performance to be degraded. Thus, most systems currently adopt conservative heuristics that can cause the cache sizes to be larger than necessary.

According to some embodiments, a method of estimating cache performance is provided that enables the cache sizes to be dynamically adapted over time. The technique is designed for LRU caches that share the same physical memory, e.g. when cache memory is segmented by application or LUNs. However, the technique is also applicable to any cache system that uses a Least Recently Used (LRU) policy for data eviction. For simplicity, some embodiments will be described in which the LRU policy that is being used to control operation of the cache is that a single page of memory is evicted from the cache every time a new page of memory is added to the cache. Other LRU policies may be used as well, since the particular techniques and data structures described herein can be used in connection with an LRU cache regardless of the LRU cache policy being used to determine which pages of memory are to be evicted from the cache over time.

When the physical memory is shared by several LRU caches, the optimal resource segmentation might not be obvious. Different workloads will have different requirements in terms of volume and speed (response time). Thus, the system that manages the cache (cache management system 128) needs to search for a robust strategy to split the physical memory of cache 118 to maximize overall performance and comply with the SLAs. This strategy may include decisions such as reducing the size of the cache associated to the LUN A (cache A), to open space to expand the size of the cache associated with LUN B (cache B). To make this decision, the cache management system needs to estimate how much it will lose by reducing the size of cache A by a first amount, and how much it will gain by expanding the size of cache B by a second amount. In an environment where the cache is partitioned into hundreds of individual cache allocations, the estimation should be done in a computationally efficient manner and enable simultaneous modeling of different sized increase and decreases for each of the cache partitions.

One primary measurement of performance in cache systems is the hit probability. When a piece of data residing on a given address of the storage system is requested and found in cache, it is considered a hit. Higher hit rates are strongly correlated with lower response times. Thus, the cache management system typically aim at maximizing hit probability.

According to some embodiments, a method is described which enables the cache partition sizes to be optimally adjusted based on estimates of cache performance under different cache partition size values. In some embodiments, the cache performance is estimated by determining potential hit gains (PHGa) and potential hit losses (PHLo) associated with cache size changes. The technique is designed to run in real-time cache systems based on LRU eviction policy, and is capable of determining the cache performance for multiple cache partition size changes.

Figure 4A:
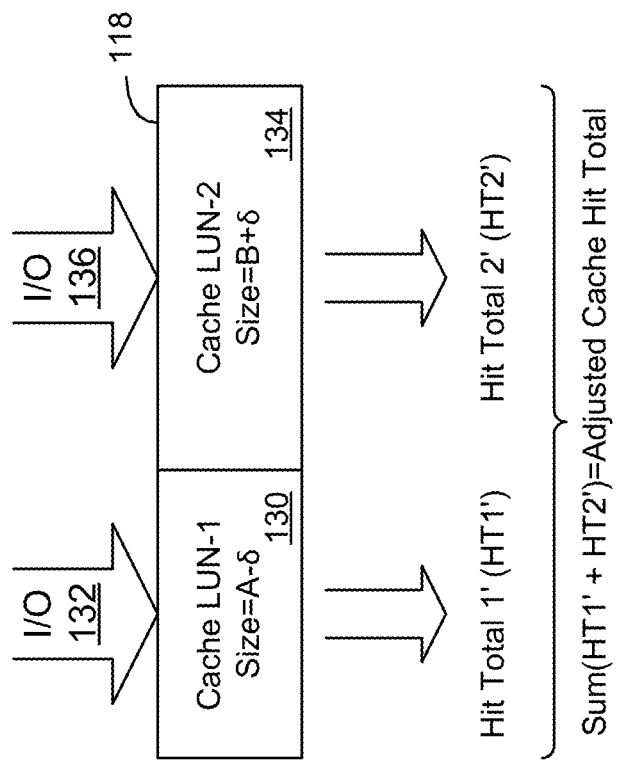
FIGS. 4A and 4B are functional block diagrams of an example partitioned cache having different cache allocations to the same set of logical volumes (LUNs).

FIG. 4A shows an example LRU cache 118 divided into two partitions 130, 134. A first partition 130 with Size=A is assigned to be used to cache pages of memory associated with LUN-1. I/O operations 132 are performed on the first partition, which results in a first Hit Total 1 (HT1). A second partition 134 with Size=B is assigned to be used to cache pages of memory associated with LUN-2. I/O operations 136 are performed on the second partition, which results in a second Hit Total 2 (HT2). The sum of the hit totals (HT1+HT2) for all of the partitions of the cache is referred to in connection with FIG. 4A as the initial cache hit total.

Initial Cache Hit Rate Total=HT1+HT2

Other metrics, such as the weighted sum may also be used to determine the overall hit ratio of the cache.

Figure 4B:
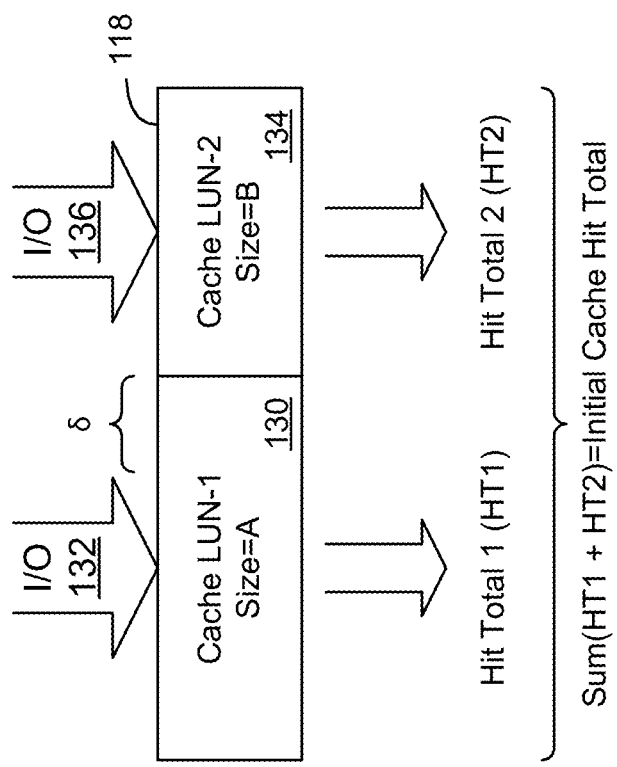

FIG. 4B shows the example LRU cache 118 divided into two partitions 130, 134 but having the sizes of the two partitions 130, 134 adjusted by an increment δ. Specifically, the size of the first partition 130 has been reduced such that its size is now Size=A−δ. I/O operations 132 are performed on the first partition, which results in a different first Hit Total 1' (HT1'). The size of the second partition 134 has been increased such that its size is now Size=B+δ. I/O operations 136 are performed on the second partition, which results in a different second Hit Total 2' (HT2'). The sum of the hit totals (HT1'+HT2') for all of the partitions of the cache is referred to in connection with FIG. 4B as the adjusted cache hit total.

Adjusted Cache Hit Total=HT1'+HT2'

If the goal of the cache management system 128 is to optimize the overall cache hit rate of the cache 118, it would be beneficial to adjust the cache from the set of partition sizes shown in FIG. 4A to the new set of partition sizes shown in FIG. 4B only if the Adjusted Cache Hit Total is larger than the Initial Cache Hit Total. For example, if the IOs 132 on the cache partition 130 are primarily random, and the IOs 136 on the cache partition 134 are primarily sequential, increasing the size of partition 134 may greatly increase the hit rate on partition 134 while not significantly reducing the hit rate on cache partition 130. Doing so requires the cache management system 128 to estimate any performance loss associated with reducing the size of the first cache partition 130 and estimate any performance increase associated with increasing the size of the second cache partition 134. According to some embodiments, as discussed in greater detail below, a set of data structures is provided that enables these estimates to be made, for each partition, for multiple sizes of cache partition increase and multiple sizes of cache partition decrease, in a computationally efficient manner. Based on the cache performance estimates, a set of cache partition sizes is determined to optimize overall performance of the cache while continuing to meet SLA values of the LUNs using the cache partitions.

Figure 5:
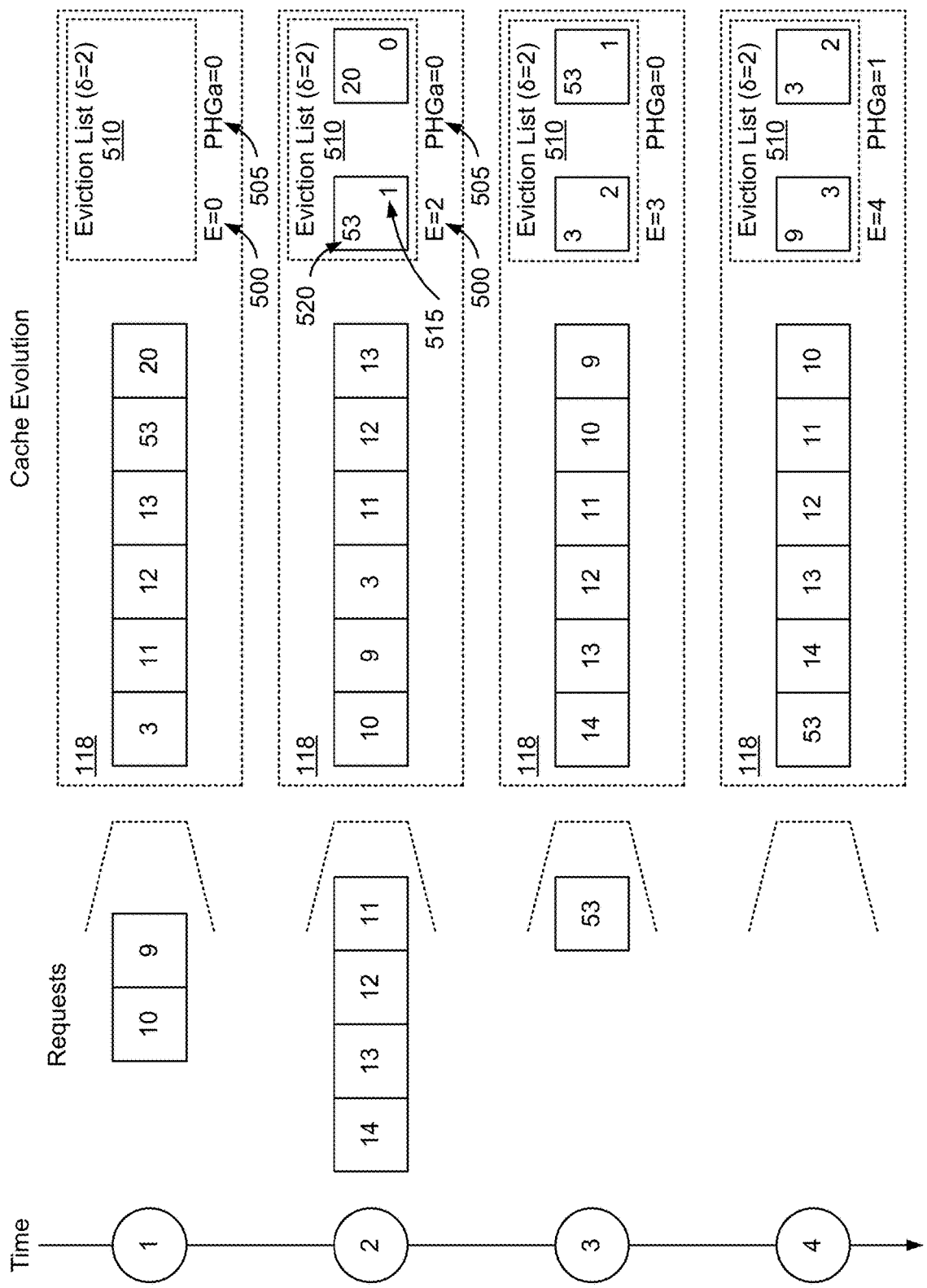
FIG. 5 is a functional block diagram showing a cache evolution over time and a data structure for determining cache potential hit gains (PHGa) if the cache size is increased according to some embodiments.

FIG. 5 shows an example cache evolution as pages are inserted into the partition of the cache 118 and evicted from the cache partition. In some embodiments, the process described in connection with FIGS. 5-9 is implemented simultaneously for each partition of cache 118. For ease of explanation, the following description will describe the manner in which cache performance estimation is implemented on a particular cache partition. A person of ordinary skill in the art would be able to extrapolate that process for application to multiple cache partitions.

A physical memory can be considered to have M slots to be used for caching purposes. Each cache $C_i$ ($1 \leq i \leq n$) has $|C_i|$ slots, which are physically stored in memory such that $\Sigma_{\forall i} |C_i| \leq M$. A slot is an arbitrary unit of data, the size of which may vary depending on the particular implementation of the storage system. In some embodiments, the slot of memory is also referred to herein as a page. Throughout the description, the notation $C_i[j]$ will be used to refer to the slot in the $j^{th}$ position of $C_i$ such that $1 \leq j' \leq |C_i|$.

A request (x, s) is considered to have a starting address x and a size $s \geq 1$. When a request (x,$) is directed to a cache $C_i$, it will necessarily occupy all the slots between $C_i[1]$ and $C_i[s]$. In other words, the first s slots of the cache will store the data from addresses x+s−1, x+s−2, ..., x+1, x (s is greater than 4 in this example).

According to the LRU policy, if a cache $C_i$ is full (i.e. all its slots are occupied) and receives a new request (x,s), one out of the two following scenarios may occur for each address x, x+1, ..., x+s−1. Specifically, if the address is already on the cache (i.e. a hit), the address is promoted to the slot $C_i[1]$ of the cache. If the address is not already in the cache (i.e. a miss), all the data already in the cache is shifted right to the next slot of the cache, and the new address is pushed to the slot $C_i[1]$. Therefore, in the event of a cache miss in an LRU cache, the data originally occupying the last slot of the cache 118 $C_i[s]$ is evicted from the cache 118.

According to some embodiments, an estimate of how many additional cache hits would occur by increasing the size of the cache is determined by looking at how many hits occur on data that has just been evicted from the cache. The estimate of how many additional hits a cache will have if the cache 118 is increased in size is referred to herein as Potential Hit Gains (PHGa).

The purpose of PHGa is to assess how many additional hits a cache $C_i$ will have if its size increases by δ slots. This can be measured by monitoring which addresses are evicted from cache and requested again after a short period (referred to herein as the reuse distance). Only the addresses that were evicted during the last δ misses need to be maintained, because those are the ones that would cause a hit if the cache were δ slots bigger.

According to some embodiments, the cache management system maintains a global eviction counter E that sums the total number of addresses evicted from cache on its history. The evicted addresses are kept in a double-linked list that will be naturally sorted by the value of the eviction counter when that address was evicted. Additionally, each address in the double-linked list has an entry in an auxiliary hash map to speed up the search for an address in the double-linked list. More precisely, such auxiliary data structure maps every page address in the double-linked list to its correspondent element in the list. Whenever the eviction value associated to the oldest address of the list is below E−δ, such address is flushed out from the list and from the hash map. This is possible, because future requests for this address would not increase the number of hits for a cache with δ extra slots.

To compute the potential hit gains, every time an address is requested and it is not in the cache (i.e. a cache miss occurs) a check is performed on the eviction list data structure to determine if the address is contained in the eviction list. If it is, the PHGa counter is incremented. The PHGa counter is evaluated periodically (e.g. at the end of each predetermined time period) to determine how much the PHGa counter changed during the particular time period of interest. The amount the value of the PHGa counter increased during the time period is the amount of additional hits that the cache would have experienced during that time period, if the cache 118 was δ slots larger during that time. Thus, the PHGa counter provides an estimate of an increase in cache hit rate associated with increasing the cache by δ slots. In some embodiments, multiple values of δ can be evaluated simultaneously, so that the cache management system 128 is able to simultaneously determine how different cache size increases would affect the cache hit rate of the cache partition.

FIG. 5 shows four snapshots of an example cache system to illustrate how the eviction list data structure 510 is maintained and how PHGa is calculated. In this example, the value of δ is 2, which means that PHGa measures how many additional hits the cache would have if there were 2 extra slots available in cache 118. Although this example provides an explanation for calculation PHGa with a value of δ=2, it should be understood that the same process can be used for other values of δ as well.

In the first stage (at time T=1), the cache 118 is full, but no eviction has ever been made in this cache history. Accordingly, at time T=1, the eviction counter 500 is set to zero (E=0) and the PHGa counter 505 is also set to zero (PHGa=0). The eviction list data structure 510 is also empty because no evictions have yet occurred from cache 118.

In the example shown in FIG. 5, at time T=1 a request (9, 2) arrives. As noted above, the request format indicates the starting address, 9 in this instance, and the length of the request, 2 addresses in this instance. Neither address 9 nor address 10 is currently stored in the cache 118 at time T=1. Accordingly, the cache evicts the last two addresses in the cache (addresses 20 and 53 in this example) to open space for addresses 9 and 10. Addresses 9 and 10 are added to the head end of the cache 118. This eviction event increments the eviction counter to 2 and both addresses 20 and 53 are stored on the eviction list data structure 510. This is shown in the second stage of FIG. 5, which shows the state of the cache at time T=2.

In some embodiments, as shown in FIG. 5, eviction list data structure 510 includes a correlation between an identity of an address that was evicted from the cache 520 and the sequential value of when that address was evicted 515. The boxes shown in the eviction list data structure 510 graphically depict this. For example, the left block contains address 53 on the upper left corner and, since it was the second address evicted from the cache, the eviction value 515 has been set to 1. As addresses are evicted, the eviction counter 500 is serially increased by one for each such evicted address, and the eviction value 515 of the entry in the eviction list is set to equal the value of the eviction counter 500 at the time the entry was evicted. It should be noted that the eviction list data structure 510 does not contain the value of the data that was contained at the address, but rather only contains the identity of the address. Thus, a read operation cannot be performed on the eviction list data structure 510, and as such the eviction list data structure 510 is not an extension of the cache but rather simply a list of addresses that were recently evicted from the cache.

When the request (11, 4) arrives at the cache 118 at time T=2, addresses 11, 12, and 13 are already in the cache. Thus, no eviction needs to occur in connection with these three addresses, and the cache hit on these three addresses simply causes addresses 11, 12, and 13 to be moved to the head of the cache, as shown in the state of the cache at time T=3. However, at time T=2, address 14 is not currently in the cache 118 and, accordingly, another eviction is necessary to open a slot for address 14. Thus, eviction counter 500 is incremented to E=3, and the eviction list is updated to add address 3 and remove address 20. In some embodiments, the process computes a difference between an address' 520 eviction value 515 and the value of the eviction counter E 500, and if the difference is greater than $\delta$, the address is removed from the eviction list. This is shown on stage 3 which shows the cache 118 at time T=3.

At time T=3, a new request for address 53 arrives. In this situation, there is a cache miss, because address 53 is not contained in the cache 118 at time T=3. However, address 53 is on the eviction list, which indicates that if the cache was $\delta$ slots larger, a cache hit would have occurred. Thus, the PHGa counter 505 is incremented to PHGa=1 as shown in the state of the cache at time T=4. The eviction necessary to enable address 53 to be added to the cache 118 causes address 9 to be evicted. The eviction list is updated so that the eviction list includes address 9 and 3, and the eviction counter 500 is updated to E=4, as shown in the state of the cache at time T=4.

Although an example was described in which $\delta$ was set to 2 for ease of explanation, other values of $\delta$ may be used. Likewise, as discussed in greater detail below, it is possible to implement multiple eviction lists or multiple PHGa counters 505 for different $\delta$ values, to simultaneously evaluate different cache size changes to identify an optimum value of $\delta$ given current IO patterns for that partition of the cache. Additionally, each partition may simultaneously be evaluated using an eviction list data structure 510, eviction counter 500, and PHGa counter 505, to determine which partitions of the cache would benefit from being increased in size and to characterize the increased hit rate associated with increasing the partition sizes of the cache.

In addition to determining the potential hit gain PHGa if a first partition of the cache is increased by $\delta$, it is also necessary to determine the Potential Hit Loss (PHLo) of a second partition of the cache 118. This is because increasing one partition size allocation results in a reduction of another partition size allocation. Reducing the other partition size allocation can result in fewer hits to the other partition of the cache.

The purpose of PHLo is to assess how many fewer hits a cache partition $C_i$ will have if its size decreases by $\delta$ slots. In some embodiments, this is measured by monitoring where in the cache the cache hits occur. If a cache hit occurs in the final $\delta$ slots of the cache partition, reducing the cache by $\delta$ slots would cause a cache miss to occur for that IO. For example, if the current total number of hits of a cache $C_i$ is 1000, and 200 of those hits occur between slots $C_i[|C_i|-\delta+1]$ and $C_i[|C_i|]$, the PHLo is 200. In other words, if the cache were $\delta$ slots smaller, the cache would have 200 fewer hits.

Figure 6:
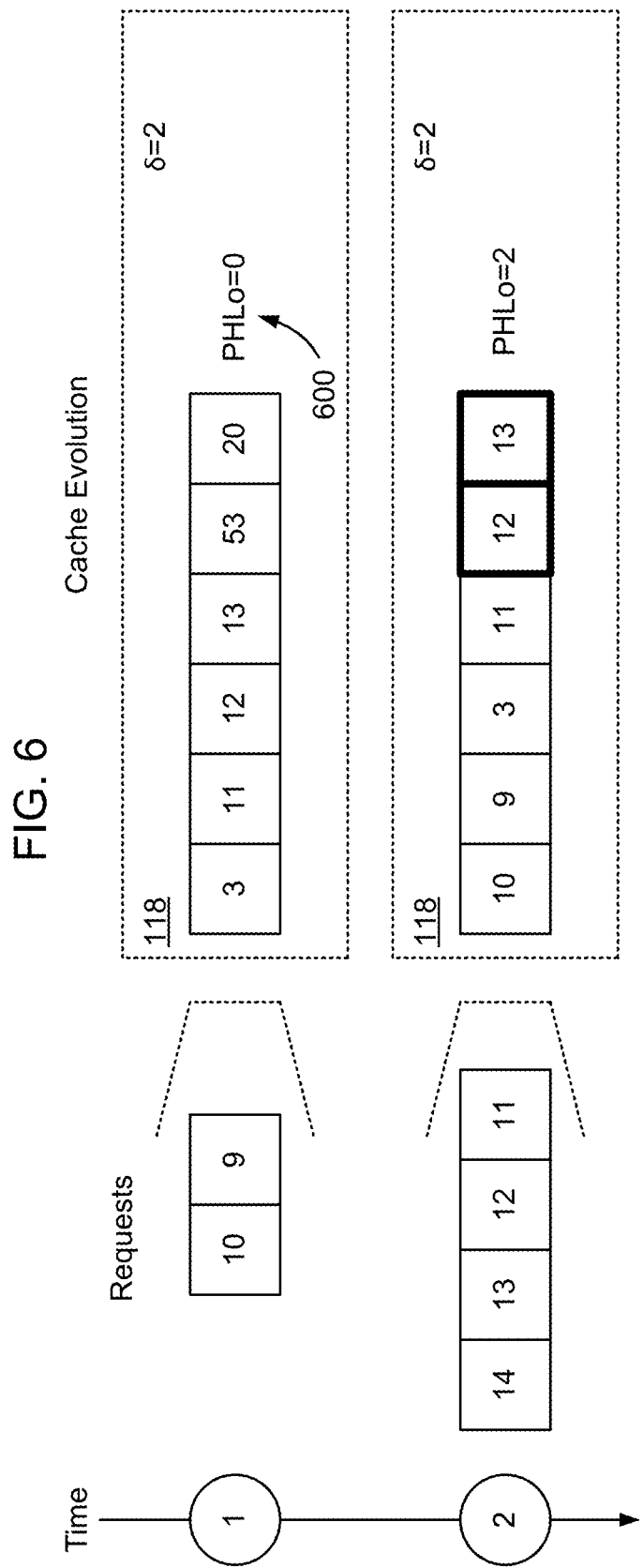
FIG. 6 is a functional block diagram showing a cache evolution over time and a data structure for determining cache potential hit losses (PHLo) if the cache size is decreased according to some embodiments.

To compute PHLo, in some embodiments a PHLo data structure 600 in the form of a PHLo hit counter is used to sum the hits that occur on the last $\delta$ slots of the cache. FIG. 6 shows a cache evolution and provides an example of how the PHLo hit counter data structure 600 is incremented over time. As shown in FIG. 6, at time T=1 the cache has values 3, 11, 12, 13, 53, and 20. If a request (9,2) arrives, there is no cache hit and the PHLo hit counter 600 remains at zero. Addresses 20 and 53 are evicted from the cache and addresses 9 and 10 are added to the head of the cache 118.

At time T=2, a request (11,4) arrives. Three of the addresses of this request (11, 12, and 13) are contained in the cache 118. Two of these addresses (12 and 13) are within the last $\delta$=2 slots of the cache 118. Accordingly, if the cache partition were $\delta$ slots smaller (i.e. 2 slots smaller), these two addresses (12 and 13) would not have been found in the cache 118. To capture the amount of potential loss associated with decreasing the cache size by $\delta$ slots, the PHLo hit counter 600 is then incremented. It is important to note that only two hits (the two that are within $\delta$ slots of the end of the cache) are used to update the PHLo hit counter 600, since only those hits would have resulted in cache misses if the cache were to be reduced by $\delta$ slots.

For the sake of simplicity, an example cache evolution was provided using a single and constant value of $\delta$. It is possible to measure PHGa and PHLo for different values of $\delta$ at once for a single cache partition $C_i$. To do so, the process uses an ordered set D=$\{\delta_1, \delta_2, \ldots, \delta_k\}$ of increments (or decrements) such that $\delta_b < \delta_{b+1} \ \forall \delta_b \in D$.

To compute PHGa, instead of storing a single counter, a separate counter is used for each different value of $\delta$ in the set D. To keep track of addresses that are evicted from the cache, a single double-linked list and hash map is used, but the length of the double-length list is set to be $\delta_k$ (the largest $\delta$ under consideration). This enables a single eviction list data structure 510 to be used to keep track of all addresses for each of the $\delta$ lengths under consideration. Whenever an address is not found in cache but found in the eviction list data structure 510, a difference is computed between its respective eviction value 515 and the current value of the global eviction counter E. This observed difference d should increment a counter PHGa[$\delta_b$] such that $\delta_b$=min(D') and D'={$\delta \forall \delta \in$ D|$\delta \geq$d}. The total hit gain for a given $\delta_x \in$ D is then defined as:

$$\Sigma_{b=1}^{x} PHGa[\delta_b]$$

For the PHLo, a separate counter is used for each $\delta \in$ D of decrements. Whenever a hit occurs in a slot $C_i[j]$ we increment a counter PHLo [$\delta_b$] such that $\delta_b$=min(D') and D'={$\delta \forall \delta \in$ D|$\delta \geq |C_i|-j+1$}. The total hit loss for a given $\delta_x \in$ D is then defined as:

$$\Sigma_{b=1}^{x} PHGo[\delta_b]$$

The usefulness of a computational process depends on whether it can be implemented in real time for an actual system. For a large-scale storage system, the computational complexity required to implement calculation of PHGa and PHLo using the method described has a time complexity on the order of 1:O(1) for each new page requested. More precisely, for every eviction all the data structures are updated in O(1) by consulting the hash map, and for every hit we just update the counter associated to the cache hit position.

Where multiple $\delta$ are included in the set D, each time a request is processed against the cache the time complexity to implement the calculation of PHGa and PHLo is a O(|D|), because it is necessary to perform the estimated cache performance for all D sizes from these data structures.

In some embodiments, the cache management system 128 maintains the data structure described above and implements the process of determining PHGa and PHLo for multiple or all partitions on cache 118. To enable the storage system to optimize throughput while maintaining SLA compliance with each partition, in some embodiments if the PHGa associated with increasing a first cache partition increases more than the PHLo associated with decreasing a second cache partition, the cache management system 128 adjusts the partition sizes to increase overall performance of the cache 118.

Figure 7:
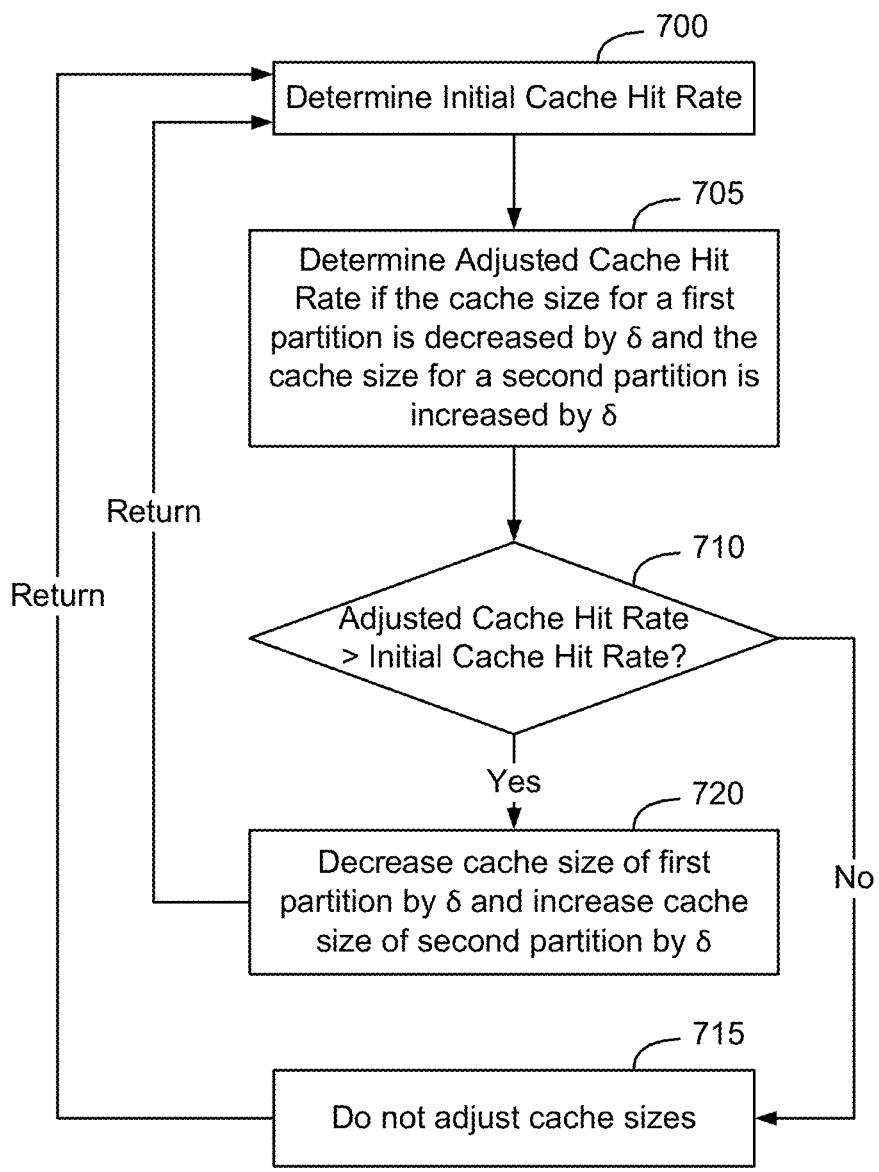
FIG. 7 is a flow chart a method of dynamically adapting cache size based on estimated cache performance.

FIG. 7 is a flow chart of a process of dynamically adjusting cache partition sizes to optimize cache hit rate according to some embodiments. As shown in FIG. 7 the storage system 100 knows the current cache hit rate (block 700), since this the current cache hit rate is a known cache parameter.

To determine how the partition sizes of the shared cache should be adjusted to increase the overall cache hit rate, the cache management system 128 determines an adjusted cache hit rate if the cache size of cache partition for LUN-1 is decreased by $\delta$ and the cache size of the cache partition for LUN-2 is increased by $\delta$ (FIG. 7 block 705).

If the adjusted cache hit rate is not greater than the initial cache hit rate (a determination of NO at block 710), the evaluated changes are not made to the cache partitions for LUN-1 and LUN-2 (FIG. 7, block 715). If the adjusted cache hit rate is greater than the initial cache hit rate (a determination of YES at block 710), the cache size of the cache partition for LUN-1 is decreased by $\delta$ and the cache size of the cache partition for LUN-2 is increased by $\delta$ (FIG. 7 block 720). Optionally, prior to adjusting the cache partitions, a determination is also made as to whether the changes would continue to enable the storage system 100 to meet its SLA obligations for each of the cache partitions.

Although the process shown in FIG. 7 shows the method in connection with a single $\delta$ and a single pair of cache partitions, as discussed above it is possible to consider a range of values for $\delta$ (both positive and negative) for each cache partition, to determine an optimal amount to change the respective cache partition sizes. Likewise, although FIG. 7 shows the method only in connection with two partitions, the same method may simultaneously look at multiple partitions of the shared cache or all partitions of the shared cache to determine candidate partitions where the cache partition size should be increased and to determine candidate partitions where reducing the cache partition size will not meaningfully decrease the cache hit rate on that partition.

Figure 8:
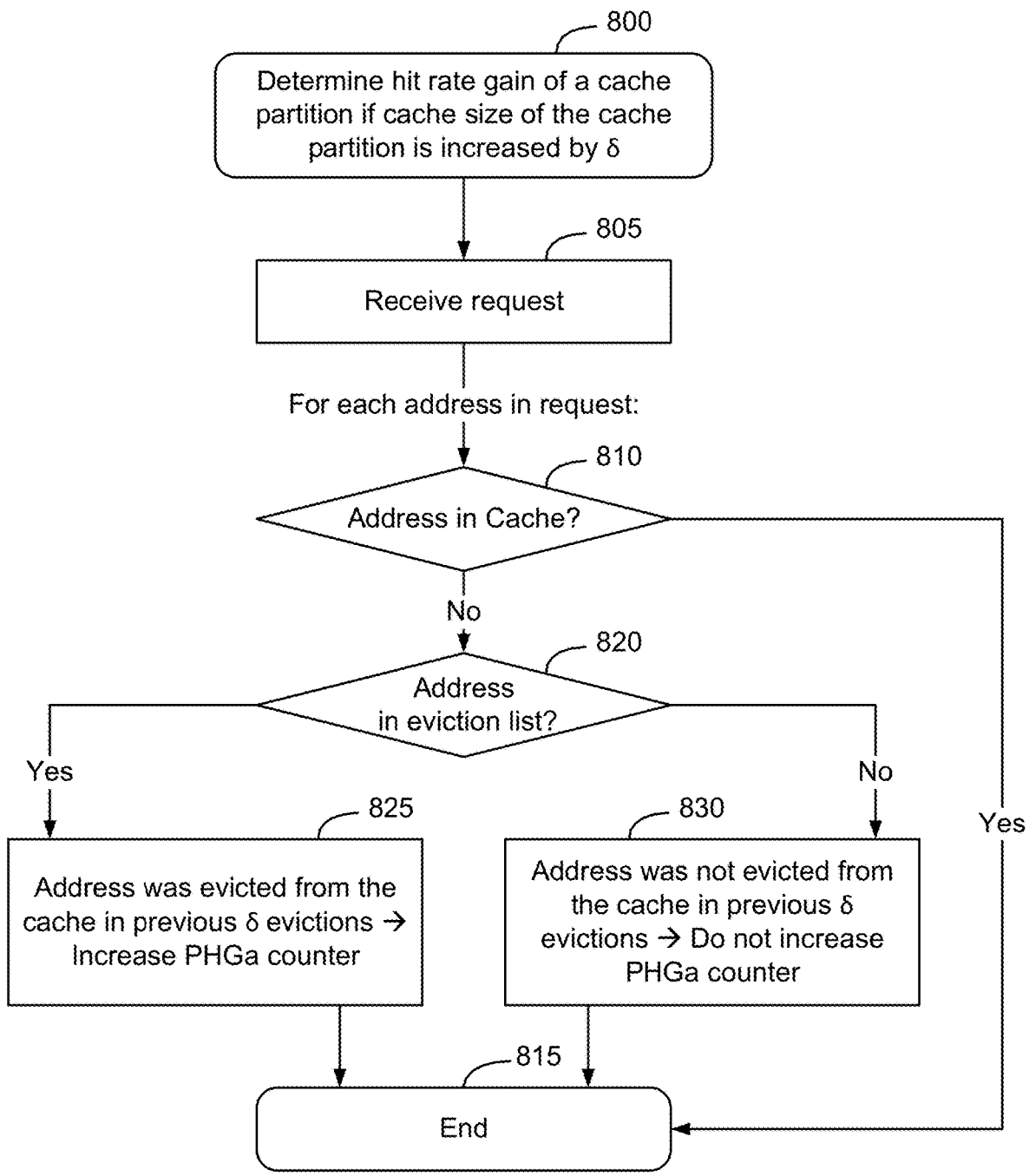
FIG. 8 is a flow chart of a method of estimating a hit rate of a partition of a least recently used (LRU) cache if the size of the partition is increased.

FIG. 8 is a flow chart of an example process of determining the hit rate increase of a cache partition, if the cache size of the cache partition is increased by $\delta$ (FIG. 8 block 800). As shown in FIG. 8, when a request is received (block 805) a determination is made as to whether the address associated with the request is contained in the cache (block 810). If the address is in the cache (a determination of YES at block 810) the process ends with respect to that address (block 815). If the address is not in the cache, a determination is made as to whether the address is in the eviction list (block 820). If the address is in the eviction list (a determination of YES at block 820), the address was evicted from the cache in the previous $\delta$ evictions and the PHGa counter is increased by one. If the address is not in the eviction list (a determination of NO at block 820), the address was not evicted from the cache in the previous $\delta$ evictions and the PHGa counter is not increased. After the PHGa counter is increased/not increased, the process ends with respect to that address. This process is performed for each address in the request received at block 805. Where there are multiple values of $\delta$ under consideration, the process is implemented for each $\delta$ under consideration.

Figure 9:
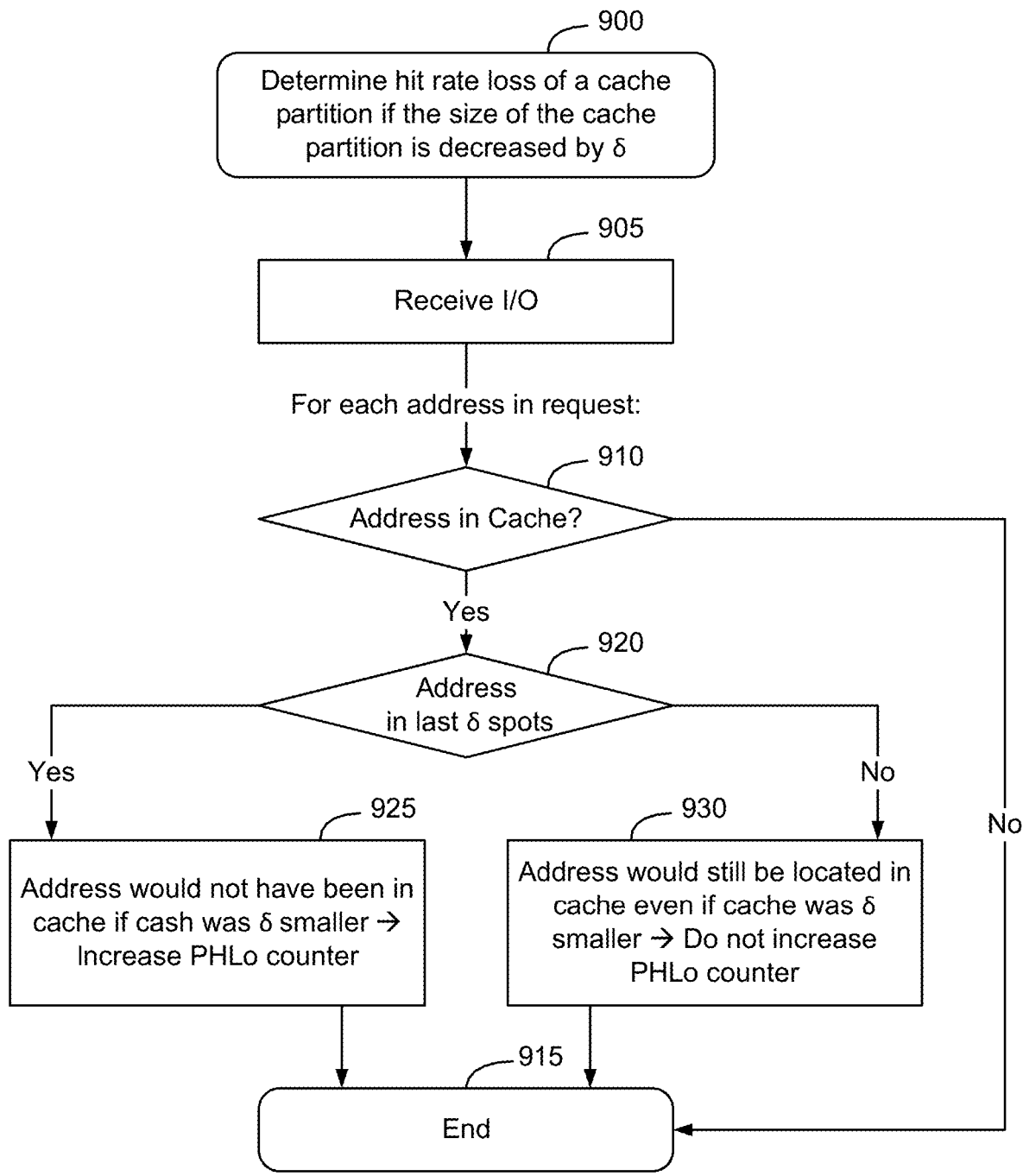
FIG. 9 is a flow chart of a method of estimating a hit rate of a partition of a least recently used (LRU) cache if the size of the partition is decreased.

FIG. 9 is a flow chart of an example process of determining the hit rate loss that would occur on a cache partition if the cache size of the cache partition is decreased by $\delta$ (FIG. 9 block 900). As shown in FIG. 9, when a request is received (block 905) a determination is made as to whether the address associated with the request is contained in the cache (block 910). If the address is not in the cache (a determination of NO at block 910) the process ends with respect to that address (block 915). If the address is in the cache (a determination of YES at block 910), a determination is made as to whether the address is in the last $\delta$ spots of the cache (block 920). If the cache hit occurred in the last $\delta$ spots of the cache (a determination of YES at block 920), the address would not have been in the cache if the cache was $\delta$ smaller. Accordingly, the PHLo counter is increased by one. If the cache hit did not occur in the last $\delta$ spots of the cache (a determination of NO at block 920), reducing the cache size $\delta$ spots would not have caused a cache miss in this instance. Accordingly, the PHLo counter is not incremented. The value of the PHLo counter can be used to determine the number of cache hits that would not have occurred during a given time interval, which indicates the amount that the cache hit rate would be decreased by reducing the size of the cache partition by $\delta$.

Although the preceding examples have focused on an environment where multiple cache partitions are sharing a cache, there are situations where the cache itself may be implemented as a single partition that has a variable size. For example, in a cloud storage environment, storage resources including cache resources may be obtained and paid for as needed. Likewise, it may be desirable to consider a single cache partition in isolation, without consideration of the other cache partitions. Accordingly, as explained in connection with FIG. 10, in some embodiments the methods described herein may be used to determine the effect of increasing or decreasing the size a cache rather than the effect of increasing and decreasing sets of partitions of the cache.

Figure 10:
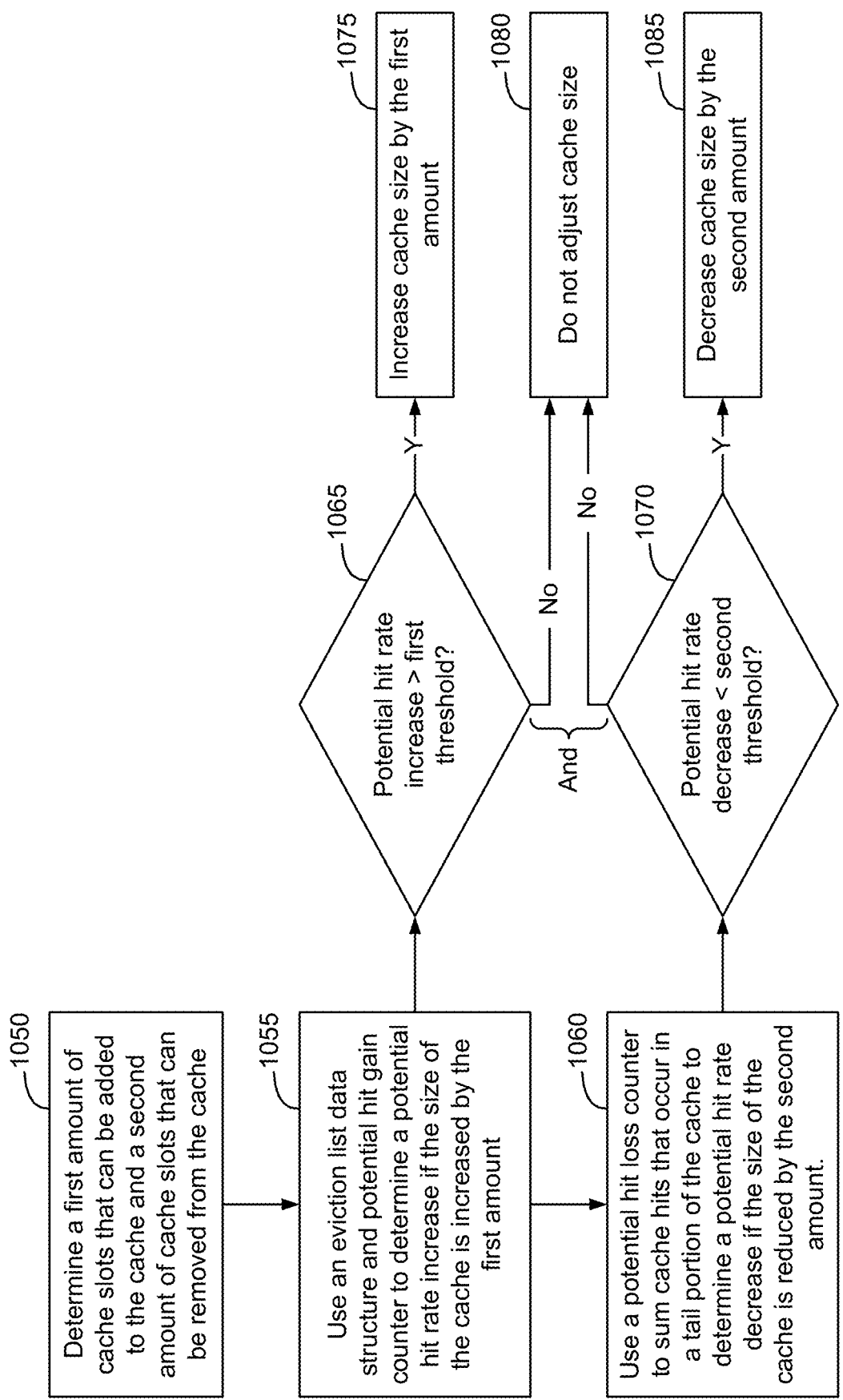
FIG. 10 is a flow chart of a method of estimating cache performance and dynamically adjusting the cache size of a variably sized cache, according to some embodiments.

FIG. 10 is a flow chart of a method of estimating cache performance and dynamically adjusting the cache size of a variably sized cache, according to some embodiments. As shown in FIG. 10, in some embodiments a determination is made relative to the possible cache size adjustments that are able to be made. For example, in a cloud environment, a cloud provider may have tiered pricing for cache resources such that a cache size of X costs a first amount, a cache size of Y costs a second amount, and a cache size of Z costs a third amount. There may be other physical limits on increases and decreases of the cache size as well.

Accordingly, as shown in FIG. 10, in some embodiments a determination is made of a first amount of cache slots that can be added to the cache and a second amount of cache slots that can be removed from the cache (block 1050). An eviction list data structure 510 and potential hit gain counter 505 are used to determine a potential cache hit rate increase if the size of the cache is increased by the first amount (block 1055). A potential hit loss counter 600 is used to sum cache hits that occur in a tail portion of the cache to determine a potential hit rate decrease if the size of the cache is reduced by the second amount (block 1060).

In some embodiments, if the potential hit rate increase is greater than a first threshold (a determination of YES at block 1065), the cache size is increased by the first amount (block 1075). If the potential hit rate decrease is less than a second threshold (a determination of YES at block 1070), the cache size is decreased by the second amount (block 1085). If the potential hit rate increase is not above the first threshold (a determination of NO at block 1065) and the potential hit rate decrease is not less than the second threshold (a determination of NO at block 1070), no adjustment is made to the cache size (block 1080). Although FIG. 10 shows a particular set of rules employing thresholds that may be used to implement the dynamic cache size adjustment based on determinations (blocks 1055 and 1060) of how adjustments to cache size will affect cache performance, other rules may be used to implement how the cache size is dynamically adjusted as well. In some embodiments, the first and second thresholds are associated with the costs of the allocated cache as priced by the cloud provider. Thus, the system only adapts the cache size if the benefit (in hit ratios or cost savings) is worth-while.

Additionally, there may be instances where both the potential hit rate increase is above the first threshold (a determination of YES at block 1065) and the potential hit rate decrease is below the second threshold (a determination of YES at block 1070). In this instance the cache rate may be increased by the first amount (block 1075) or another rule may be used to determine how the cache size should be adjusted depending on the cache policy being used to regulate the use and allocation of cache resources.

Figure 11:
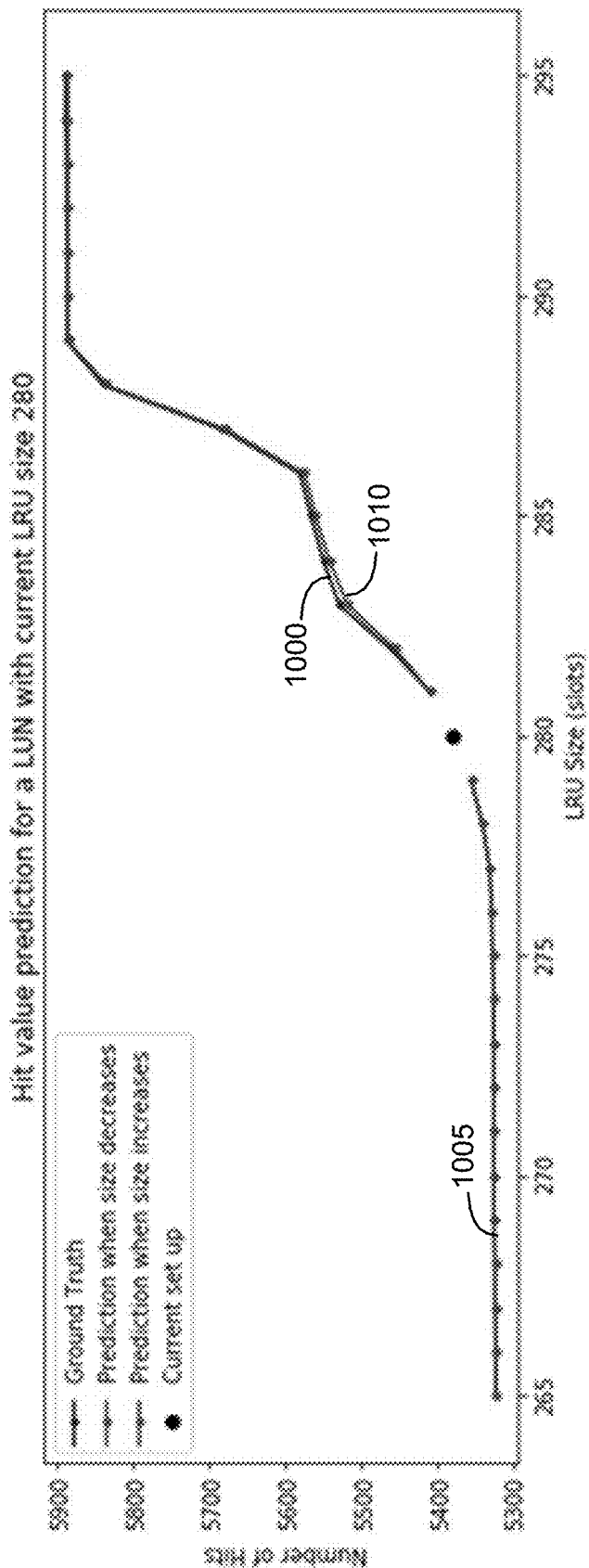
FIG. 11 is a graph showing a comparison between a predicted number of hits and the real number of hits when varying an LRU cache size.

An experiment was conducted to determine computationally if predicting PHGa and PHLo using this process is able to validly predict cache hit rates. FIG. 9 shows a graph generated by embedding the method of predicting PHGa and PHLo into an LRU cache simulator. For a specific cache partition (LUN), the simulator ran once for each cache size in the interval [265, 295]. FIG. 11 shows the prediction chart for a specific LUN after running the simulator with a cache size equal to 280. In particular, FIG. 11 is a graph showing a comparison between the predicted number of hits 1010 and the real number of hits 1000 when varying the LRU cache size. Notice that the predicted number of hits associated with decreasing the LRU cache size (1005) exactly matches the correspondent real number of hits. The predictive values associated with increasing the cache size (1010) was found to be equal to or slightly below the real number of hits 1000. In this example, the difference is at most 0.2%.

Using the process described herein, it is therefore possible to estimate the cache hit rates that would occur under varying cache sizes, which can be used to intelligently dynamically adapt cache sizes to changing traffic patterns. The method monitors cache hits and cache evictions to estimate potential gains and losses when the cache size is updated. The proposed technique applies to any cache system, although it is specially designed for those that segment the memory area into separate regions to serve different beneficiaries.

In some embodiments, PHGa and PHLo are continuously monitored over time and periodically the PHGa and PHLo values for various cache partitions are collected and used by the cache management system 128 to determine how the cache partition sizes should be adjusted. This evaluation process by the cache management system 128 may iterate every evaluation period, for example every five minutes, to determine how the cache partition sizes should be dynamically adjusted over time. By monitoring how alternative cache partition sizes would affect the cache hit rate under the current IO operational conditions, the cache management system 128 is able to directly determine what cache partition size adjustments would have increase the current cache hit rate, and determine precisely how much changing the cache partition size adjustments would have increased the current cache hit rate. By making the cache partition size adjustments in real time, the cache management system 128 can dynamically adapt the cache partition sizes to traffic characteristics to increase performance of the storage system 100 as a whole.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of dynamically adjusting sizes of cache partitions of a cache, comprising:
using an eviction list data structure and potential hit gain counter to determine a potential cache partition hit rate increase of a first of the cache partitions if a size of the first of the cache partitions is increased by a first amount; and
using a potential hit loss counter to sum cache hits that occur in a tail portion of a second of the cache partitions to determine a potential cache partition hit decrease of the second of the cache partitions if a size of the second of the cache partitions is reduced by a second amount;
wherein using the potential hit loss counter to sum cache hits that occur in the tail portion of the second of the cache partitions to determine the potential cache partition hit decrease comprises determining, for each cache hit, where the cache hit occurred in the second of the cache partitions, and if the cache hit occurred in the tail portion of the second of the cache partitions, incrementing the potential hit loss counter.

2. The method of claim 1, wherein the second amount is equal to the first amount.

3. The method of claim 1, wherein the step of using the eviction list data structure to determine the potential cache partition hit rate increase of the first of the cache partitions comprises:
maintaining the eviction list data structure, the eviction list data structure containing an ordered list of addresses evicted from the first of the cache partitions, and maintaining a Potential Hit Gain (PHGa) counter data structure;
in connection with eviction of a first address from the first of the cache partitions, determining whether the first address is contained in the eviction list data structure; and
if the first address is contained in the eviction list data structure, incrementing the PHGa counter, and if the first address is not contained in the eviction list data structure, not incrementing the PHGa counter.

4. The method of claim 3, wherein the eviction list data structure is implemented as a linked list of addresses, and each address has an eviction value indicating when it was evicted from the cache.

5. The method of claim 4, further comprising a hash table of addresses contained in the eviction list data structure, and wherein the step of determining whether the first address is contained in the eviction list data structure comprises determining whether the address is contained in the hash table.

6. The method of claim 4, wherein the step of maintaining an eviction list data structure comprises adding recently evicted addresses to the eviction list data structure and removing addresses from the eviction list data structure that have eviction values greater than a threshold from an eviction counter.

7. The method of claim 6, wherein the eviction counter has a value indicative of a number of evictions that have occurred from the first of the cache partitions.

8. The method of claim 1, wherein the tail portion of the second of the cache partitions is a range of addresses equal to the second amount.

9. The method of claim 1, further comprising dynamically increasing the size of the first of the cache partitions and reducing the size of the second of the cache partitions if the determined potential cache partition hit rate increase associated with increasing the size of the first of the cache partitions exceeds the determined potential cache partition hit decrease of decreasing the size of the second of the cache partitions.

10. A method of dynamically adjusting a size of a cache, comprising:
determining a first amount of cache slots that can be added to the cache;
using an eviction list data structure and potential hit gain counter to determine a potential hit rate increase if the size of the cache is increased by the first amount;
increasing the cache size by the first amount if the potential hit rate increase is greater than a first threshold;
determining a second amount of cache slots that can be removed from the cache;
using a potential hit loss counter to sum cache hits that occur in a tail portion of the cache to determine a potential hit rate decrease if the size of the cache is reduced by the second amount; and
reducing the cache size by the second amount if the potential hit rate decrease is less than a second threshold and the potential hit rate increase is less than the first threshold.

11. The method of claim 10, wherein if the potential hit rate increase is less than the first threshold and the potential hit rate decrease is greater than a second threshold, not adjusting the cache size.

12. The method of claim 10, wherein if the potential hit rate increase is greater than the first threshold and the potential hit rate decrease is less than a second threshold, increasing the size of the cache by the first amount.

13. A method of dynamically adjusting a size of a cache, comprising:
determining a first amount of cache slots that can be added to the cache;
using an eviction list data structure and potential hit gain counter to determine a potential hit rate increase if the size of the cache is increased by the first amount; and
increasing the cache size by the first amount if the potential hit rate increase is greater than a first threshold;
wherein the eviction list data structure is implemented as a linked list of addresses, and each entry has an eviction value indicating when it was evicted from the cache; and
wherein the step of maintaining the eviction list data structure comprises adding recently evicted addresses to the eviction list data structure and removing addresses from the eviction list data structure that have eviction values greater than a threshold from an eviction counter.

14. The method of claim 13, wherein the eviction counter has a value indicative of a number of evictions that have occurred from the cache.

15. The method of claim 10, wherein the tail portion of the cache is a range of addresses equal to the second amount.

* * * * *